United States Patent
Im

(10) Patent No.: US 12,141,570 B2
(45) Date of Patent: Nov. 12, 2024

(54) APPARATUS FOR PERFORMING VEHICLE OTA UPDATE AND METHOD THEREOF

(71) Applicants: Hyundai Motor Company, Seoul (KR); Kia Corporation, Seoul (KR)

(72) Inventor: Keyng Bin Im, Asan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 154 days.

(21) Appl. No.: 17/848,117

(22) Filed: Jun. 23, 2022

(65) Prior Publication Data

US 2023/0030129 A1 Feb. 2, 2023

(30) Foreign Application Priority Data

Jul. 28, 2021 (KR) .......................... 10-2021-0099395

(51) Int. Cl.
   *G06F 8/65* (2018.01)
   *H04L 67/12* (2022.01)
(52) U.S. Cl.
   CPC ................. *G06F 8/65* (2013.01); *H04L 67/12* (2013.01)
(58) Field of Classification Search
   CPC ................................... G06F 8/65; H04L 67/12
   USPC ........................................................ 717/172
   See application file for complete search history.

(56) References Cited

U.S. PATENT DOCUMENTS

| | | | |
|---|---|---|---|
| 2019/0212997 A1* | 7/2019 | Sangameswaran | H04L 67/52 |
| 2019/0265965 A1* | 8/2019 | Acharya | H04L 12/40 |
| 2020/0174778 A1* | 6/2020 | David | H04W 4/80 |
| 2020/0192655 A1* | 6/2020 | Jeong | G07C 5/0816 |
| 2021/0192865 A1* | 6/2021 | Maruno | G06F 21/31 |
| 2022/0326934 A1* | 10/2022 | Goto | G06F 11/0796 |
| 2023/0022655 A1 | 1/2023 | Im | |

FOREIGN PATENT DOCUMENTS

KR    10-2023-0015202 A    1/2023

OTHER PUBLICATIONS

Halder et al, "Secure OTA Software Updates in Connected Vehicles: A Survey", 2019, [Online], pp. 1-18, [Retrieved from internet on Sep. 13, 2024], <chrome-extension://efaidnbmnnnibpcajpcglclefindmkaj/https://arxiv.org/pdf/1904.00685>(Year: 2019).*

* cited by examiner

*Primary Examiner* — S. Sough
*Assistant Examiner* — Zengpu Wei
(74) *Attorney, Agent, or Firm* — Morgan, Lewis & Bockius LLP

(57) ABSTRACT

An apparatus of performing a vehicle over-the-air (OTA) update is provided. The apparatus includes a reception device that receives instruction information for determining a reference state of charge (SOC) value of a battery for a vehicle for performing an OTA update of the vehicle, a reference SOC value determination device that determines the reference SOC value, in response to the instruction information being received, and a generation device that generates information related to whether to perform the OTA update based on the determined reference SOC value.

14 Claims, 4 Drawing Sheets

APPARATUS FOR PERFORMING VEHICLE OTA UPDATE AND METHOD THEREOF

CROSS-REFERENCE TO RELATED APPLICATION

The present application claims priority to Korean Patent Application No. 10-2021-0099395, filed on Jul. 28, 2021, the entire contents of which is incorporated herein for all purposes by this reference.

BACKGROUND OF THE PRESENT DISCLOSURE

Field of the Present Disclosure

The present disclosure relates to an apparatus for performing a vehicle over-the-air (OTA) update and a method thereof.

Description of Related Art

In general, an integrated central control unit (ICU), which performs OTA of the vehicle, may determine a specific SOC value of a battery prior to an OTA update. Only when a value obtained by subtracting a state of charge (SOC) value used to perform an OTA update from a current SOC value of the battery for vehicle is greater than the above-mentioned specific SOC value (or a reference SOC value), the ICU may perform the OTA update. In other words, only when the battery is not discharged after the OTA update is performed, the ICU may perform the OTA update.

Herein, due to battery aging or the like, although the battery is charged or is fully charged, the SOC value may fail to be sufficiently high. In the instant case, when it is determined to perform the OTA update depending on the above-mentioned method, because the current SOC value of the battery is always small, it is unable to perform the OTA update in any case.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for correcting a reference SOC value, which is a criterion for determining whether to perform an OTA update, and performing the OTA update, although the current SOC value of the battery is low due to battery aging or the like.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of performing a vehicle over-the-air (OTA) update may include a reception device that receives instruction information for determining a reference state of charge (SOC) value of a battery for a vehicle for performing an OTA update of the vehicle, a reference SOC value determination device that determines the reference SOC value, in response to the instruction information being received, and a generation device that generates information related to whether to perform the OTA update based on the determined reference SOC value.

Furthermore, according to various exemplary embodiments of the present disclosure, the reference SOC value may indicate one of a first SOC value or a second SOC value.

Furthermore, according to various exemplary embodiments of the present disclosure, the first SOC value may indicate an SOC value received from a server. The second SOC value may indicate a predetermined SOC value. The predetermined SOC value may indicate a minimum SOC value for performing the OTA update.

Furthermore, according to various exemplary embodiments of the present disclosure, the SOC value received from the server may be less than the predetermined SOC value.

Furthermore, according to various exemplary embodiments of the present disclosure, the information related to whether to perform the OTA update may indicate one of information indicative of performing the OTA update or information indicative of not performing the OTA update.

Furthermore, according to various exemplary embodiments of the present disclosure, the information related to whether to perform the OTA update may indicate one of the information indicative of performing the OTA update or the information indicative of not performing the OTA update, based on the determined reference SOC value and a remaining SOC value expected after the performance of the OTA update is completed.

Furthermore, according to various exemplary embodiments of the present disclosure, the expected remaining SOC value may correspond to a difference value between a current SOC value of the battery and an SOC value used to perform the OTA update.

Furthermore, according to various exemplary embodiments of the present disclosure, the information related to whether to perform the OTA update may indicate the information indicative of performing the OTA update, in response to the expected remaining SOC value being greater than the determined reference SOC value. The information related to whether to perform the OTA update may indicate the information indicative of not performing the OTA update, in response to the expected remaining SOC value being less than the determined reference SOC value.

Furthermore, according to various exemplary embodiments of the present disclosure, the OTA update may be performed for an integrated central control unit (ICU) included in the vehicle, in response to the information related to whether to perform the OTA update indicating the information indicative of performing the OTA update.

Furthermore, according to various exemplary embodiments of the present disclosure, the apparatus may further include a transmission device that transmits the generated information related to whether to perform the OTA update to a central communication unit (CCU) included in the vehicle.

According to another aspect of the present disclosure, a method for performing a vehicle over-the-air (OTA) update may include receiving instruction information for determining a reference state of charge (SOC) value of a battery for a vehicle for performing an OTA update of the vehicle, determining the reference SOC value, in response to the instruction information being received, and generating information related to whether to perform the OTA update based on the determined reference SOC value.

Furthermore, according to various exemplary embodiments of the present disclosure, the reference SOC value may indicate one of a first SOC value or a second SOC value.

Furthermore, according to various exemplary embodiments of the present disclosure, the first SOC value may indicate an SOC value received from a server. The second SOC value may indicate a predetermined SOC value. The predetermined SOC value may indicate a minimum SOC value for performing the OTA update.

Furthermore, according to various exemplary embodiments of the present disclosure, the SOC value received from the server may be less than the predetermined SOC value.

Furthermore, according to various exemplary embodiments of the present disclosure, the information related to whether to perform the OTA update may indicate one of information indicative of performing the OTA update or information indicative of not performing the OTA update.

Furthermore, according to various exemplary embodiments of the present disclosure, the information related to whether to perform the OTA update may indicate one of the information indicative of performing the OTA update or the information indicative of not performing the OTA update, based on the determined reference SOC value and a remaining SOC value expected after the performance of the OTA update is completed.

Furthermore, according to various exemplary embodiments of the present disclosure, the expected remaining SOC value may correspond to a difference value between a current SOC value of the battery and an SOC value used to perform the OTA update.

Furthermore, according to various exemplary embodiments of the present disclosure, the information related to whether to perform the OTA update may indicate the information indicative of performing the OTA update, in response to the expected remaining SOC value being greater than the determined reference SOC value. The information related to whether to perform the OTA update may indicate the information indicative of not performing the OTA update, in response to the expected remaining SOC value being less than the determined reference SOC value.

Furthermore, according to various exemplary embodiments of the present disclosure, the OTA update may be performed for an ICU included in the vehicle, in response to the information related to whether to perform the OTA update indicating the information indicative of performing the OTA update.

Furthermore, according to various exemplary embodiments of the present disclosure, the method may further include transmitting the generated information related to whether to perform the OTA update to a CCU included in the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
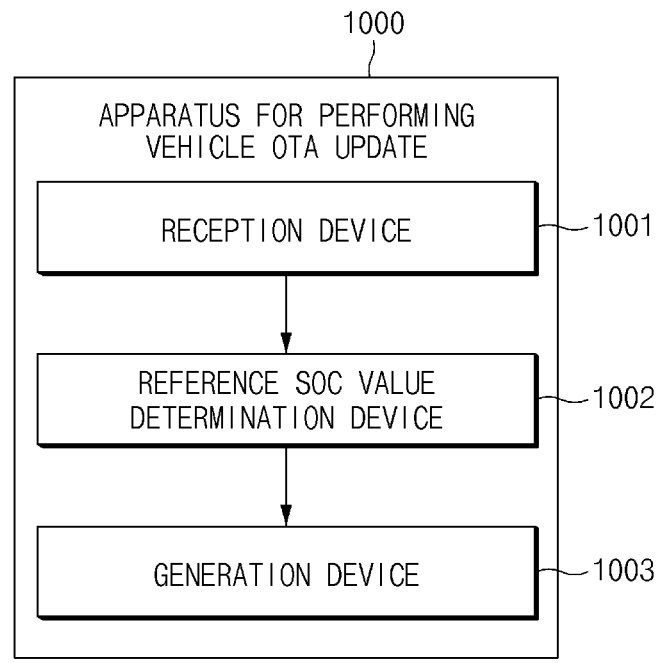
FIG. 1 illustrates an example of an apparatus of performing a vehicle OTA update according to various exemplary embodiments.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding the reference numerals to the components of each drawing, it should be noted that the identical component is designated by the identical numerals even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, and FIG. 4.

FIG. 1 illustrates an example of an apparatus of performing a vehicle over-the-air (OTA) update according to various exemplary embodiments of the present disclosure.

The drawing is a block diagram illustrating an example of an apparatus 1000 for performing a vehicle OTA update (or an apparatus 1000) according to various exemplary embodiments of the present disclosure.

The OTA update according to various exemplary embodiments of the present disclosure may indicate a scheme of updating software of a vehicle using a wireless communication network. In general, a software update of the vehicle may be performed by connecting a storage device storing data for the software update to the vehicle by wire. Herein, due to the development of communication technology, it is possible for the vehicle to directly receive and update data necessary for a software update using the wireless communication network.

In general, an integrated central control unit (ICU), which performs OTA of the vehicle, may determine a specific SOC value of a battery prior to an OTA update. Only when a value obtained by subtracting a state of charge (SOC) value used to perform an OTA update from a current SOC value of the battery for vehicle is greater than the above-mentioned specific SOC value (or a reference SOC value), the ICU may perform the OTA update. In other words, only when the battery is not discharged after the OTA update is performed, the ICU may perform the OTA update.

Herein, due to battery aging or the like, although the battery is charged or is fully charged, the SOC value may fail to be sufficiently high. In the instant case, when it is determined to perform OTA depending on the above-mentioned method, because the current battery SOC value is always small, it is unable to perform an OTA update in any case.

The apparatus 1000 for performing a vehicle OTA update may correct a reference SOC value, which is a criterion for determining whether to perform an OTA update and may update the OTA update when a current battery SOC value is low due to battery aging or the like.

The apparatus 1000 according to various exemplary embodiments of the present disclosure may include a reception device 1001, a reference SOC value determination device 1002, and/or a generation device 1003. The apparatus 1000 according to various exemplary embodiments of the present disclosure may further include one or more elements which is or are not shown in the drawing. The apparatus 1000 according to various exemplary embodiments of the present disclosure may be located inside or outside the vehicle.

The reception device 1001 according to various exemplary embodiments of the present disclosure may receive instruction information for determining a reference SOC value of a battery for a vehicle to perform an OTA update of the vehicle. A description of the OTA update is the same as that described above. In other words, the instruction information according to various exemplary embodiments of the present disclosure may be information where the apparatus 1000 instructs to determine the above-mentioned SOC value.

The SOC value according to various exemplary embodiments of the present disclosure may be a value used to determine whether to perform an OTA update of the vehicle. The reference SOC value may indicate one of a first SOC value or a second SOC value.

The first SOC value according to various exemplary embodiments of the present disclosure may indicate an SOC value received from a server. The server may be a server which transmits information for an OTA update of the vehicle to the apparatus 1000 or the vehicle.

The second SOC value according to various exemplary embodiments of the present disclosure may indicate a predetermined SOC value. For example, the second SOC value may a value preset in the above-mentioned ICU. The second SOC value may indicate the above-mentioned reference SOC value (or the above-mentioned predetermined SOC value).

According to various exemplary embodiments of the present disclosure, the SOC value received from the server may be less than the above-mentioned predetermined SOC value. In other words, the first SOC value according to various exemplary embodiments of the present disclosure may indicate the reference SOC value when considering the above-mentioned battery aging or the like. Thus, the apparatus 1000 may receive the first SOC value less than the second SOC value from the server and may perform an OTA update based on the first SOC value.

The reference SOC value determination device 1002 may determine a reference SOC value in response to the instruction information being received. As described above, the reference SOC value may be used to cause the apparatus 1000 to determine whether to perform an OTA update.

The generation device 1003 according to various exemplary embodiments of the present disclosure may generate information related to whether to perform an OTA update based on the determined reference SOC value. The apparatus 1000 according to various exemplary embodiments of the present disclosure may perform the OTA update for a controller (e.g., an ICU) included in the vehicle, based on the generated information related to whether to perform the OTA update.

According to various exemplary embodiments of the present disclosure, the information related to whether to perform the OTA update may indicate one of information indicative of performing the OTA update or information indicative of not performing the OTA update. The information related to whether to perform the OTA update may be determined as one of the information indicative of performing the OTA update or the information indicative of not performing the OTA update based on the above reference SOC value. A detailed description of the process of determining the information related to whether to perform the OTA update will be provided below with reference to FIG. 3.

The apparatus 1000 according to various exemplary embodiments of the present disclosure may determine whether to perform an OTA update of the vehicle based on the method described in the drawing and may perform the OTA update. In other words, although a current SOC value of the battery is significantly reduced due to battery aging or the like, the apparatus 1000 may correct the reference SOC value and may perform the OTA update of the vehicle, by the method described in the drawing.

Figure 2:
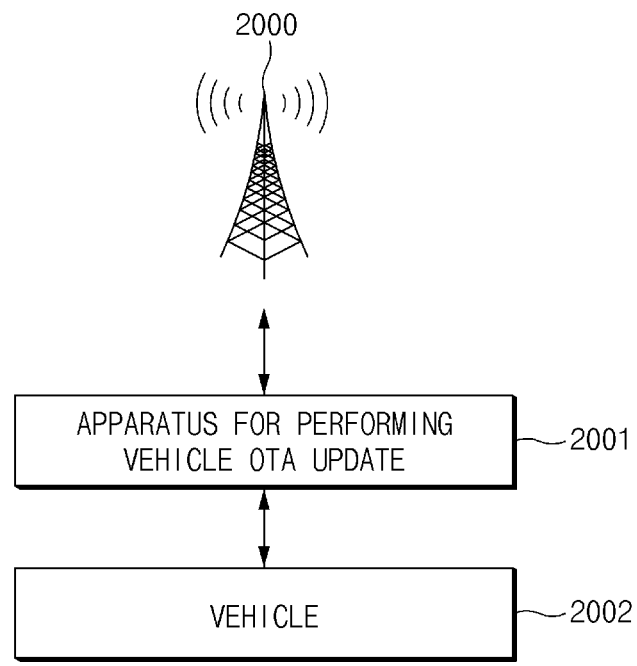
FIG. 2 illustrates an example of an environment where an apparatus of performing a vehicle OTA update operates according to various exemplary embodiments.

FIG. 2 illustrates an example of an environment where an apparatus of performing a vehicle OTA update operates according to various exemplary embodiments of the present disclosure.

The drawing is a drawing illustrating an example of an environment where an apparatus of performing a vehicle OTA update (an apparatus described above with reference to FIG. 1) operates.

An apparatus 2001 for performing a vehicle OTA update according to various exemplary embodiments of the present disclosure may transmit/receive information for an OTA update with a server 2000 and a vehicle 2002. As described above with reference to FIG. 1, the apparatus 2001 may be included in the vehicle 2002 or may be located outside the vehicle 2002.

The server 2000 according to various exemplary embodiments of the present disclosure may be the same or similar to a server described above with reference to FIG. 1. In other words, the server 2000 may transmit information related to an OTA update to the apparatus 2001. For example, the server 2000 may transmit information indicating a first SOC value (e.g., a first SOC value described above with reference to FIG. 1) to the apparatus 2001.

The apparatus 2001 according to various exemplary embodiments of the present disclosure may generate information related to whether to perform an OTA update of the vehicle 2002 (e.g., information related to whether to perform an OTA update of the vehicle described above with reference to FIG. 1), based on the information related to the OTA update, which is received from the server 2000, (e.g., information indicating the first SOC value).

The apparatus 2001 according to various exemplary embodiments of the present disclosure may perform or fail to perform the OTA update of the vehicle 2002 based on the information related to whether to perform the OTA update of the vehicle 2002.

The apparatus 2001 according to various exemplary embodiments of the present disclosure may determine whether to perform an OTA update of the vehicle 2002 based on the method described in the drawing and may perform the OTA update. In other words, although a current SOC value of the battery is significantly reduced due to battery aging or the like, the apparatus 2001 may correct a reference SOC value and may perform the OTA update of the vehicle 2002, by the method described in the drawing.

Figure 3:
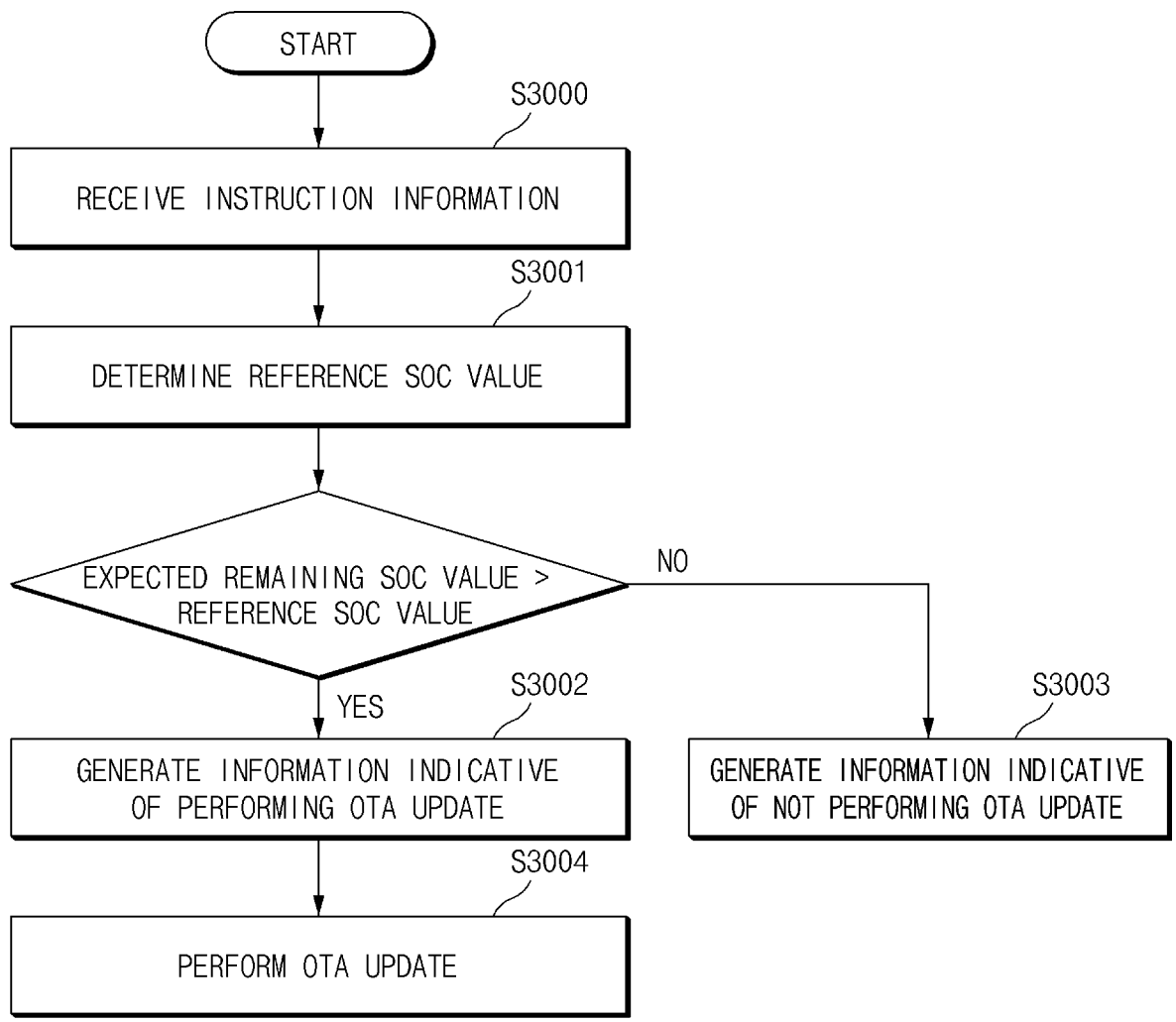
FIG. 3 illustrates an example of a process of performing a vehicle OTA update according to various exemplary embodiments.

FIG. 3 illustrates an example of a process of performing a vehicle OTA update according to various exemplary embodiments of the present disclosure.

The drawing is a flowchart illustrating an example of a process of performing a vehicle OTA update (e.g., an OTA update described above with reference to FIG. 1 and FIG. 2) according to various exemplary embodiments of the present disclosure.

An apparatus 1000 or 2001 described above with reference to FIG. 1 or 2 may perform the example of the process described in the drawing.

In S3000, a reception device (e.g., a reception device 1001 described above with reference to FIG. 1) may receive instruction information (e.g., instruction information described above with reference to FIG. 1). In other words, the reception device according to various exemplary embodiments of the present disclosure may receive the instruction information and may cause an apparatus (e.g., an apparatus 1000 described above with reference to FIG. 1) to determine a reference SOC value (e.g., a reference SOC value described above with reference to FIG. 1).

In S3001, a reference SOC value determination device (e.g., a reference SOC value determination device 1002 described above with reference to FIG. 1) may determine the reference SOC value in response to the instruction information being received. As described above with reference to FIG. 1, the apparatus (e.g., a generation device 1003 described above with reference to FIG. 1) according to various exemplary embodiments of the present disclosure may generate information indicative of performing an OTA update based on the reference SOC value.

As described above with reference to FIG. 1, information related to whether to perform an OTA update according to various exemplary embodiments of the present disclosure may indicate one of information indicative of performing the OTA update or information indicative of not performing the OTA update, based on the determined reference SOC value and a remaining SOC value expected after the performance of the OTA update is completed.

A description of the expected remaining SOC value may be the same or similar to that described above with reference to FIG. 1. In other words, the expected remaining SOC value may correspond to a difference value between a current SOC value of the battery and an SOC value used to perform an OTA update.

The generation device 1003 according to various exemplary embodiments of the present disclosure may generate information related to whether to perform an OTA update.

According to various exemplary embodiments of the present disclosure, in response to the expected remaining SOC value being greater than the determined reference SOC value, in S3002, the information related to whether to perform the OTA update may indicate the information indicative of performing the OTA update. Furthermore, according to various exemplary embodiments of the present disclosure, in response to the expected remaining SOC value being less than the determined reference SOC value, in S3003, the information related to whether to perform the OTA update may indicate the information indicative of not performing the OTA update.

The apparatus according to various exemplary embodiments of the present disclosure may transmit the above-mentioned generated information related to whether to perform the OTA update to a CCU included in a vehicle. Thereafter, in S3004, the CCU may perform the OTA update of the vehicle based on the received information related to whether to perform the OTA update. For example, in response to the information related to whether to perform the OTA update indicating the information indicative of performing the OTA update, the OTA update may be performed for an ICU included in the vehicle.

Furthermore, in response to the information related to whether to perform the OTA update indicating the information indicative of not performing the OTA update, the apparatus (or the above-mentioned CCU) may fail to perform the OTA update of the vehicle.

In other words, only when the expected remaining SOC value is greater than the above-mentioned reference SOC value, the apparatus according to various exemplary embodiments of the present disclosure may perform the OTA update. Furthermore, as described above with reference to FIG. 1 and FIG. 2, the reference SOC value may indicate one of a first SOC value or a second SOC value. Thus, the apparatus may set the reference SOC value to the first SOC value, in response to the presence of information indicating the first SOC value.

A description of the first SOC value and the second SOC value according to various exemplary embodiments of the present disclosure may be the same or similar to that described above with reference to FIG. 1 and FIG. 2. In other words, when receiving the information indicating the first SOC value from a server, the apparatus may set the first SOC value indicating a value less than the second SOC value to the reference SOC value. Accordingly, although an SOC value of the battery is not sufficient after the battery is fully charged due to battery aging or the like, the apparatus may determine whether to perform an OTA update of the vehicle based on the first SOC value.

The apparatus according to various exemplary embodiments of the present disclosure may determine whether to perform an OTA update of the vehicle based on the method described in the drawing and may perform the OTA update. In other words, although the current SOC value of the battery is significantly reduced due to battery aging or the like, the apparatus may correct the reference SOC value and may perform the OTA update of the vehicle, by the method described in the drawing.

Figure 4:
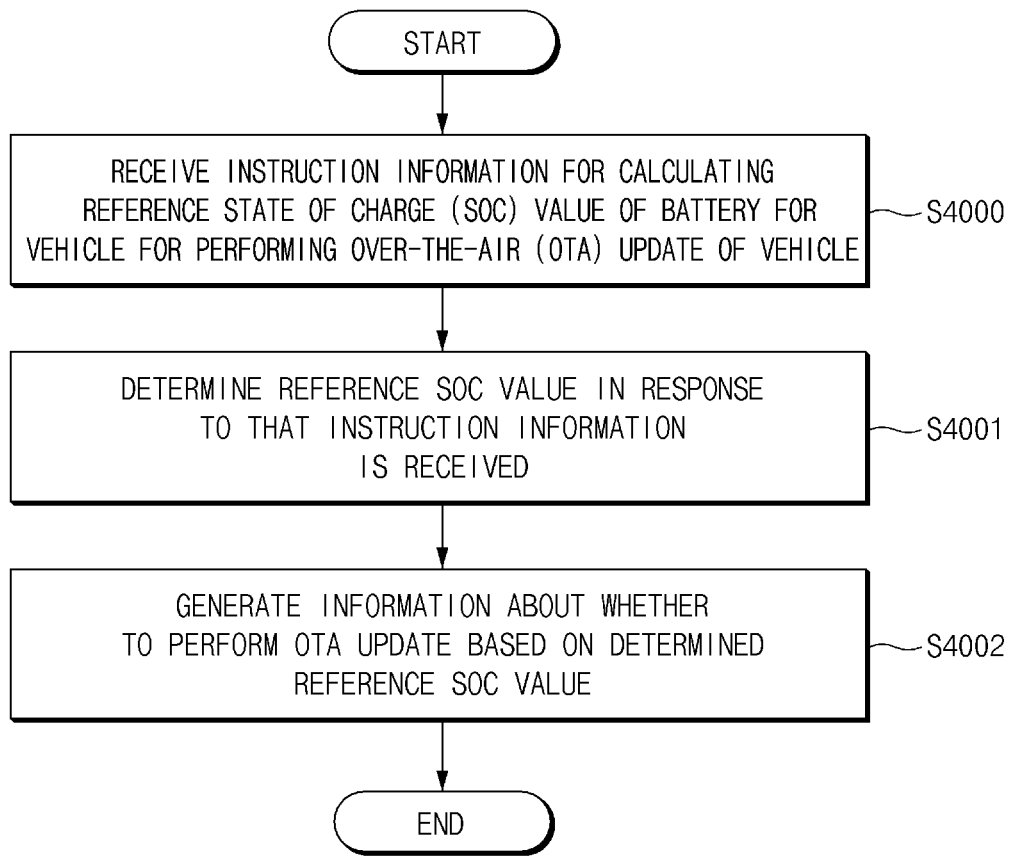
FIG. 4 is a flowchart illustrating an example of a method for performing a vehicle OTA update according to various exemplary embodiments of the present disclosure.

FIG. 4 is a flowchart illustrating an example of a method for performing a vehicle OTA update according to various exemplary embodiments of the present disclosure.

The drawing is a flowchart illustrating an example of the method for performing the vehicle OTA update (or the method) according to various exemplary embodiments of the present disclosure. An apparatus 1000 or 2001 described in FIG. 1, 2, or 3 may perform the method described in the drawing.

The method according to various exemplary embodiments of the present disclosure may include receiving (S4000) instruction information for determining a state of charge (SOC) value of a battery for a vehicle for perform an OTA update of a vehicle, determining (S4001) the reference SOC value in response to the instruction information being received, and generating (S4002) information related to whether to perform the OTA update based on the determined reference SOC value. The method according to various exemplary embodiments of the present disclosure may further include one or more steps which is or are not shown in the drawing.

According to various exemplary embodiments of the present disclosure, a description of the OTA update, the reference SOC value, the instruction information, and the information related to whether to perform the OTA update may be the same or similar to that described above with reference to FIG. 1, FIG. 2, and FIG. 3.

The reference SOC value according to various exemplary embodiments of the present disclosure may indicate one of a first SOC value or a second SOC value. A detailed description of the first SOC value and the second SOC value may be the same or similar to that described above with reference to FIG. 1, FIG. 2, and FIG. 3.

The first SOC value according to various exemplary embodiments of the present disclosure may indicate an SOC value received from a server. According to various exemplary embodiments of the present disclosure, the second SOC value may indicate a predetermined SOC value, and the predetermined SOC value may indicate a minimum SOC value necessary to perform an OTA update.

According to various exemplary embodiments of the present disclosure, the SOC value received from the server may be less than the predetermined SOC value.

According to various exemplary embodiments of the present disclosure, a description of the server, the predetermined SOC value, and the minimum SOC value for performing the OTA update may be the same or similar to that described above with reference to FIG. 1, FIG. 2, and FIG. 3.

According to various exemplary embodiments of the present disclosure, the information related to whether to perform the OTA update may indicate one of information indicative of performing the OTA update or information indicative of not performing the OTA update. According to various exemplary embodiments of the present disclosure, a description of the information related to whether to perform the OTA update may be the same or similar to that described above with reference to FIG. 1, FIG. 2, and FIG. 3.

Information related to whether to perform an OTA update according to various exemplary embodiments of the present disclosure may indicate one of the information indicative of performing the OTA update or the information indicative of not performing the OTA update, based on the determined reference SOC value and a remaining SOC value expected after the performance of the OTA update is completed.

The expected remaining SOC value according to various exemplary embodiments of the present disclosure may correspond to a difference value between a current SOC value of the battery and an SOC value used to perform an OTA update.

According to various exemplary embodiments of the present disclosure, in response to the expected remaining SOC value being greater than the determined reference SOC value, the information related to whether to perform the OTA update may indicate the information indicative of performing the OTA update. According to various exemplary embodiments of the present disclosure, in response to the expected remaining SOC value being less than the determined reference SOC value, the information related to whether to perform the OTA update may indicate the information indicative of not performing the OTA update.

According to various exemplary embodiments of the present disclosure, in response to the information related to whether to perform the OTA update indicating the information indicative of performing the OTA update, the OTA update may be performed for an ICU included in the vehicle.

The method according to various exemplary embodiments of the present disclosure may further include transmitting the generated information related to whether to perform the OTA update to a CCU included in the vehicle.

The apparatus 1000 or 2001 according to various exemplary embodiments of the present disclosure may determine whether to perform an OTA update of the vehicle based on the method described in the drawing and may perform the OTA update. In other words, although the current SOC value of the battery is significantly reduced due to battery aging or the like, the apparatus 1000 or 2001 may correct the reference SOC value and may perform the OTA update of the vehicle, by the method described in the drawing.

Embodiments may correct a reference SOC value, which is a criterion for determining whether to perform an OTA update, and may perform the OTA update, although the current SOC value of the battery is low due to battery aging or the like.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of performing a vehicle over-the-air (OTA) update,
the apparatus comprising:
a memory storing program instructions; and
one or more processors configured to execute the program instructions, the program instructions when executed configured to:
receive instruction information for determining a reference state of charge (SOC) value of a battery for a vehicle for performing an OTA update of the vehicle;
determine the reference SOC value, in response to the instruction information being received; and
generate information related to whether to perform the OTA update based on the determined reference SOC value,
wherein the reference SOC value comprises a first SOC value received from a server and a predetermined second SOC value,
wherein the first SOC value is less than the second SOC value, and
wherein the processor is further configured to:
determine the first SOC value as the reference SOC value based on a determination that a state of health (SOH) of the battery is less than a predetermined value; and
perform the OTA update based on comparing a current SOC value of the battery and the reference SOC value.

2. The apparatus of claim 1, wherein the information related to whether to perform the OTA update includes one of information indicative of performing the OTA update or information indicative of not performing the OTA update.

3. The apparatus of claim 2, wherein the information related to whether to perform the OTA update includes one of the information indicative of performing the OTA update or the information indicative of not performing the OTA update, based on the determined reference SOC value and a remaining SOC value expected after the performance of the OTA update is completed.

4. The apparatus of claim 3, wherein the expected remaining SOC value corresponds to a difference value between the current SOC value of the battery and an SOC value to be used to perform the OTA update.

5. The apparatus of claim 3,
wherein the information related to whether to perform the OTA update includes the information indicative of performing the OTA update, in response to the expected remaining SOC value being greater than the determined reference SOC value, and
wherein the information related to whether to perform the OTA update includes the information indicative of not performing the OTA update, in response to the expected remaining SOC value being less than the determined reference SOC value.

6. The apparatus of claim 2, wherein the OTA update is performed for an integrated central control unit (ICU) included in the vehicle, in response to the information related to whether to perform the OTA update indicating the information indicative of performing the OTA update.

7. The apparatus of claim 1, wherein the processor is further configured to transmit the generated information related to whether to perform the OTA update to a central communication unit (CCU) included in the vehicle.

8. A method for performing a vehicle over-the-air (OTA) update, the method comprising:

receiving instruction information for determining a reference state of charge (SOC) value of a battery for a vehicle for performing an OTA update of the vehicle;
determining the reference SOC value, in response to the instruction information being received; and
generating information related to whether to perform the OTA update based on the determined reference SOC value,
wherein the reference SOC value comprises a first SOC value received from a server and a predetermined second SOC value,
wherein the first SOC value is less than the second SOC value,
wherein the determining of the reference SOC value comprises determining the first SOC value as the reference SOC value based on a determination that a state of health (SOH) of the battery is less than a predetermined value, and
wherein the generating the information related to whether to perform the OTA update includes performing the OTA update based on comparing a current SOC value of the battery and the reference SOC value.

9. The method of claim 8, wherein the information related to whether to perform the OTA update includes one of information indicative of performing the OTA update or information indicative of not performing the OTA update.

10. The method of claim 9, wherein the information related to whether to perform the OTA update includes one of the information indicative of performing the OTA update or the information indicative of not performing the OTA update, based on the determined reference SOC value and a remaining SOC value expected after the performance of the OTA update is completed.

11. The method of claim 10, wherein the expected remaining SOC value corresponds to a difference value between the current SOC value of the battery and an SOC value to be used to perform the OTA update.

12. The method of claim 10,
wherein the information related to whether to perform the OTA update includes the information indicative of performing the OTA update, in response to the expected remaining SOC value being greater than the determined reference SOC value, and
wherein the information related to whether to perform the OTA update includes the information indicative of not performing the OTA update, in response to the expected remaining SOC value being less than the determined reference SOC value.

13. The method of claim 9, wherein the OTA update is performed for an integrated central control unit (ICU) included in the vehicle, in response to the information related to whether to perform the OTA update indicating the information indicative of performing the OTA update.

14. The method of claim 8, further including:
transmitting the generated information related to whether to perform the OTA update to a central communication unit (CCU) included in the vehicle.

* * * * *